(12) United States Patent
Fergusson et al.

(10) Patent No.: US 6,760,983 B2
(45) Date of Patent: Jul. 13, 2004

(54) TRENCHING EQUIPMENT

(76) Inventors: Gordon Macdonel Fergusson, Matakohe West Road, RD 2, Matakohe (NZ), 0353; Keith Alexander Fergusson, Matakohe West Road, RD 2, Matakohe (NZ), 0353

(*) Notice: Subject to any disclaimer, the term of this patent is extended or adjusted under 35 U.S.C. 154(b) by 0 days.

(21) Appl. No.: 10/111,190

(22) PCT Filed: May 28, 2001

(86) PCT No.: PCT/NZ01/00101
§ 371 (c)(1),
(2), (4) Date: Apr. 22, 2002

(87) PCT Pub. No.: WO01/92647
PCT Pub. Date: Dec. 6, 2001

(65) Prior Publication Data
US 2002/0162252 A1 Nov. 7, 2002

(30) Foreign Application Priority Data
May 31, 2000 (NZ) .............................................. 504841

(51) Int. Cl.$^7$ ................................................. E02F 3/02
(52) U.S. Cl. ......................................... 37/363; 37/362
(58) Field of Search .......................... 37/189, 190, 462, 37/463, 464, 465, 347, 352, 355, 363, 362

(56) References Cited

U.S. PATENT DOCUMENTS

| | | | | |
|---|---|---|---|---|
| 2,991,571 A | * | 7/1961 | Hyster | 37/403 |
| 3,050,881 A | * | 8/1962 | Brown | 37/352 |
| 3,054,198 A | * | 9/1962 | George et al. | 37/363 |
| 3,104,481 A | * | 9/1963 | George et al. | 37/352 |
| 3,593,804 A | * | 7/1971 | Snider | 172/10 |
| 3,614,838 A | * | 10/1971 | Wherry | 37/465 |
| 3,754,341 A | * | 8/1973 | Caldwell et al. | 37/352 |
| 3,846,922 A | * | 11/1974 | Horton | 37/353 |
| 4,429,477 A | * | 2/1984 | Tice et al. | 37/363 |
| 4,571,859 A | * | 2/1986 | Leischer | 37/352 |
| 4,651,449 A | * | 3/1987 | Rose | 37/465 |
| 4,924,609 A | * | 5/1990 | Martin | 37/465 |
| 6,154,987 A | * | 12/2000 | Rumer et al. | 37/352 |
| 6,421,938 B1 | * | 7/2002 | Kitanaka | 37/465 |
| 6,516,542 B2 | * | 2/2003 | McClure | 37/142.5 |

FOREIGN PATENT DOCUMENTS

| | | |
|---|---|---|
| AU | A-14034/88 | 9/1988 |
| EP | 0061229 | 9/1982 |

\* cited by examiner

Primary Examiner—Victor Batson
(74) Attorney, Agent, or Firm—Young & Thompson

(57) ABSTRACT

A hand-held, self-contained motor-driven trenching device (100) for cutting a slit or trench within a substrate is based on a chain-saw motor unit together with a purpose-built attachment. An unmodified chain-saw drive unit provides both motive force and a holder, although purpose-built units may employ other forms of motive power. A chain-driven reduction drive matches the chain-saw drive sprocket (101) speed to a suitable toothed digging chain cutting speed; the reduction drive being coupled to a sprocket wheel (102) aligned at one end of a sturdy, hardened steel blade (106) over which a heavy roller chain (200) bearing soil-cutting teeth (203) is pulled. The resulting trench is about 30–35 mm wide, up to 1 meter deep, and of indefinite length. The invention provides an optimized solution to a need for burying narrow cables, fiber-optic conduits, water pipes, and the like well into the ground.

16 Claims, 4 Drawing Sheets

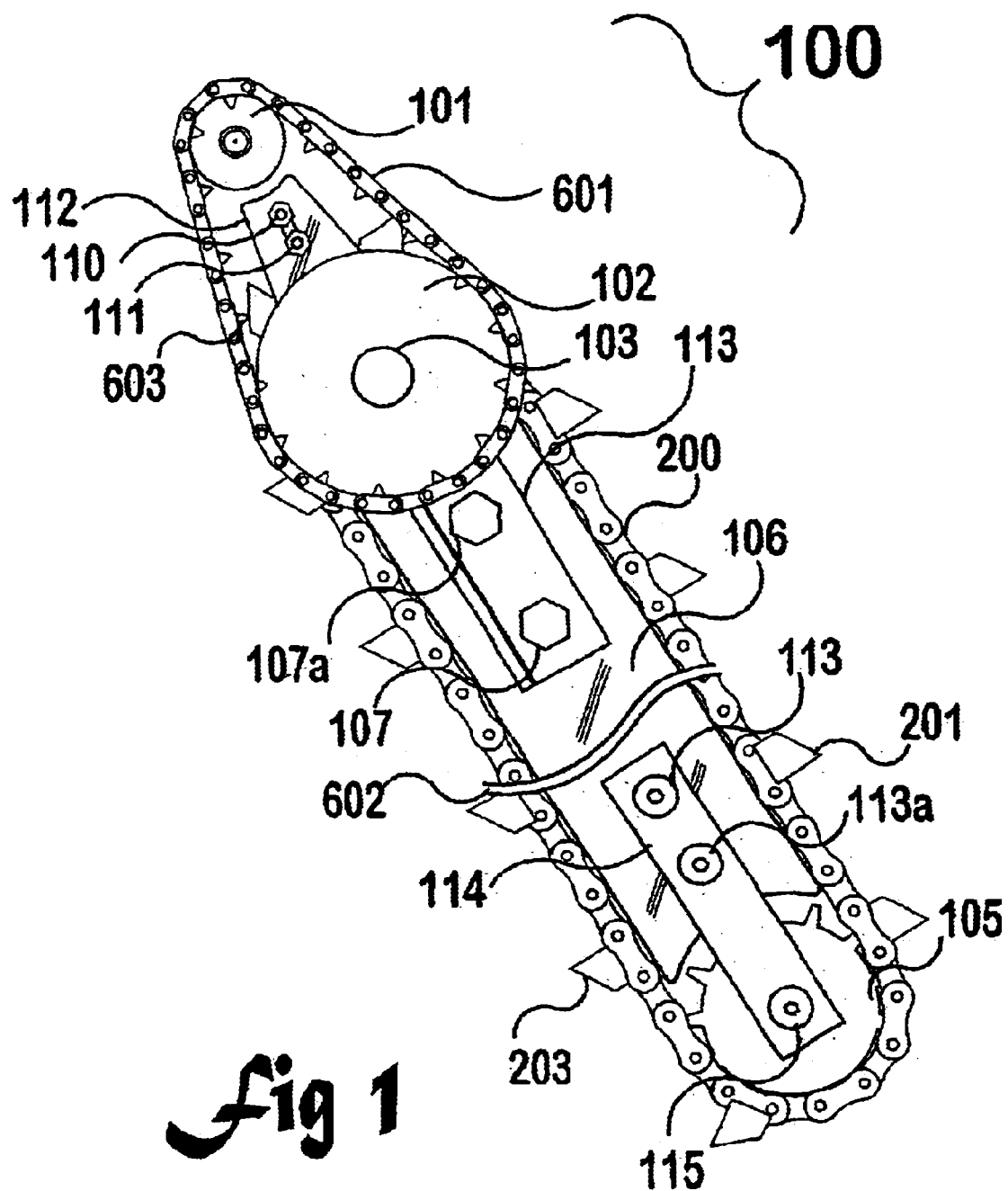

Figure 7:
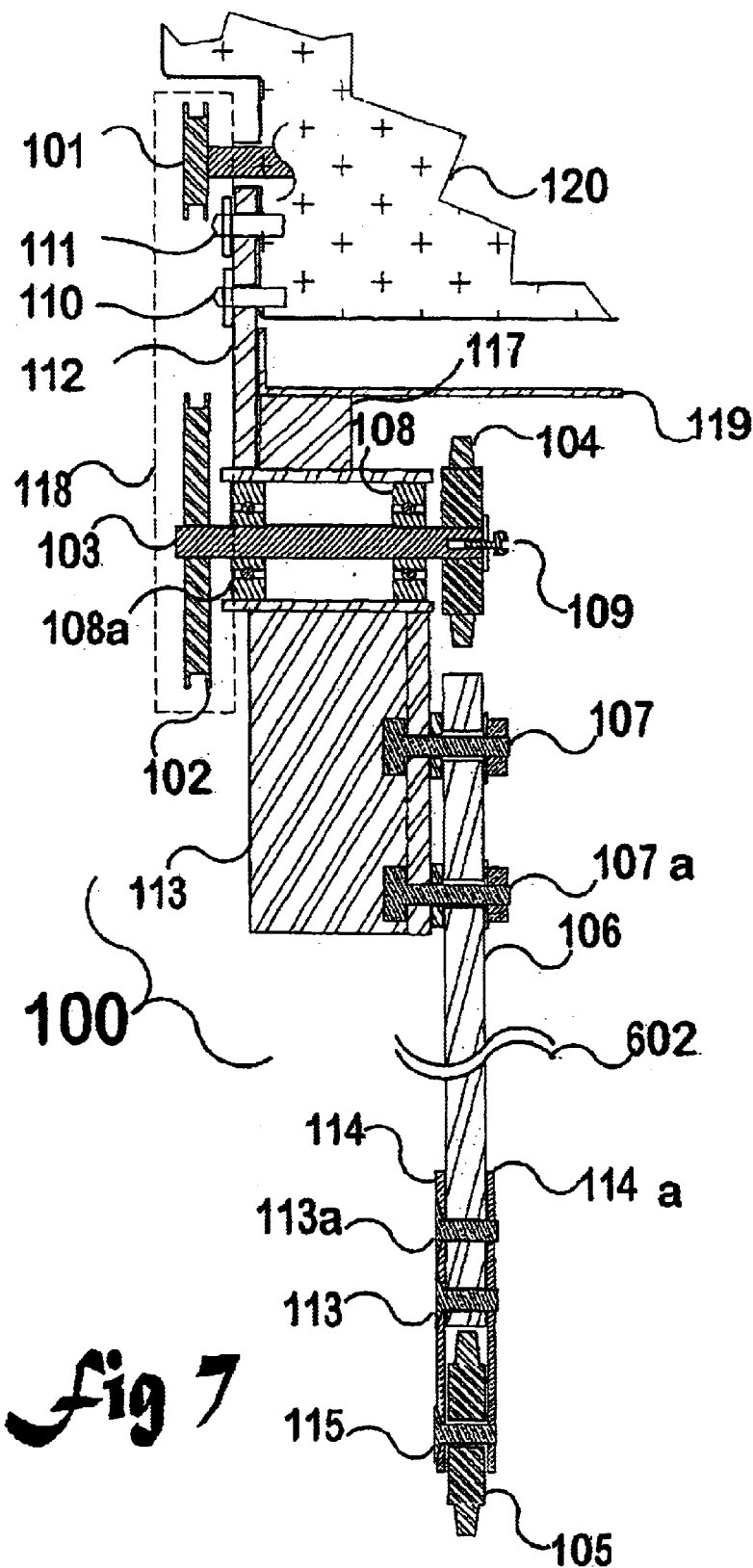

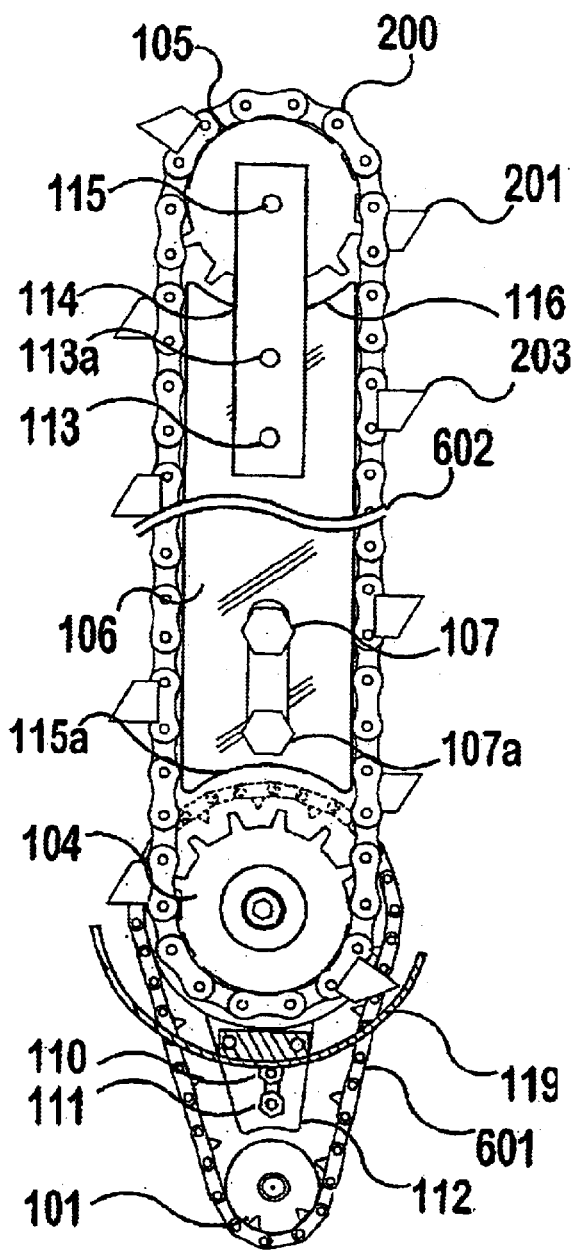
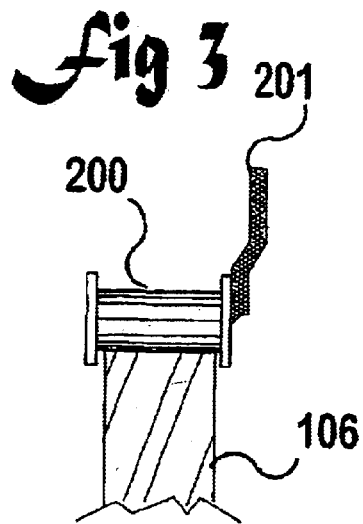
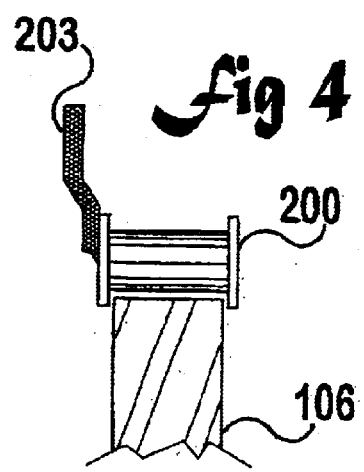
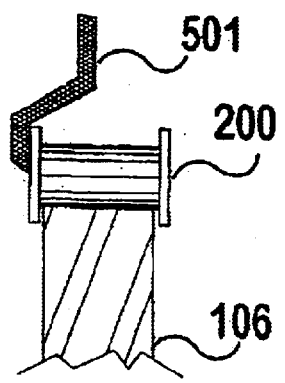
fig 6
fig 3
fig 4
fig 5

US 6,760,983 B2

TRENCHING EQUIPMENT

FIELD

This invention relates to portable motorised equipment for digging a trench into the ground, particularly hand-held equipment, and includes attachments for existing hand-held power units.

BACKGROUND

The power digging of holes or trenches is many times faster than manual digging with hand tools. Because of the considerable horsepower needed to drive a chain or mechanical digger, its weight and size, and the need for stable control of the digging bar or bucket, virtually all mechanical digging tools are mounted on a custom made vehicle. This makes them physically large, expensive, impractical, or uneconomic to own or to use for small jobs, and difficult to transport, typically requiring a second vehicle to take them from place to place.

On many occasions about a house, a farm, or at construction sites, there is a need to bury a relatively small conduit down to perhaps 1 meter deep within the ground—typical conduit diameters being about 25 mm for examples such as telephone cables, for water pipes about a farm, or small mains power cables. It is wasteful to dig a trench for such a thin conduit with hand tools which are usually about 150 mm wide or more, or to use one of the previously mentioned chain or mechanical diggers.

Observing the power and degree of control available from a chain saw style power unit, experiments have taken place to ascertain whether a useful and cost-effective trench digger could be created using a chain-saw as a power unit. Chain-saws are widely distributed, there being about 25,000 chain-saws sold in New Zealand (about one per 120 persons) per annum. It appears preferable to direct the invention towards providing an attachment capable of being reversibly attached to an existing chain-saw, for those who already possess a chain-saw. The blade is usually held in place with two bolts.

A review of the prior art in this general area reveals: (1) U.S. Pat. No. 4,429,477 Tice et al, who describe a modified chain-saw, including a gear reducer, for digging (and particularly deals with digger chain tooth design) (2) U.S. Pat. No. 4,651,449 Rose. (3) U.S. Pat. No. 4,922,763 Ashworth where an ordinary chain-saw is provided with a catcher for dragged-up soil, to serve as a soil sampler, and (4) the more extreme U.S. Pat. No. 4,799,320 West et al (which provides horizontally aimed augers to each side of the far end of a chain-saw blade). (5) U.S. Pat. No. 4,660,306 Bruce et al describes a trencher attachment for use on the arm of a hydraulic excavator. There is a group of patents for digging chains for dedicated excavators. Example chain patents are: U.S. Pat. No. 6,154,987 Rumer et al, U.S. Pat. No. 4,924,609 Martin, U.S. Pat. No. 4,893,464 Thuerman, U.S. Pat. No. 4,651,449 Rose (this chain is for a chain-saw), U.S. Pat. No. 3,913,979 Strauss et al, and U.S. Pat. No. 3,846,922 Horton.

The problem to be solved might be stated as "to provide a cheap, portable powered trenching machine able to be held by a person while in use".

OBJECT

It is an object of this invention to provide means for the portable, motorised digging of a trench or at least to provide the public with a useful choice.

STATEMENT OF INVENTION

In a first broad aspect this invention provides a hand-held, self-contained motor-driven trenching device for cutting a slit within a substrate, wherein the trenching device includes a driven digging chain in the form of an endless loop, having attached teeth, the chain surrounding an outwardly and downwardly protruding cutting beam and being capable of being pulled along a side of the cutting beam by means of a driven rotatable chain engagement means, and wherein the cutting beam is placed substantially in line with the centre of mass of the trenching device, so that the weight of the trenching device falls evenly on the cutting beam when in use to cut a slit in the substrate, and so that in use a person holding the motor-driven trenching device does not experience undue sideways pressure.

Preferably the spacing along the shaft between the driven sprocket and the primary chain receiving sprocket is sufficient to place the driven sprocket in line with the centre of gravity of the assembled chain-saw and attachment, so that in use a person holding the assembly does not experience a sideways torque caused by an unbalanced mass.

Optionally that spacing along the shaft may be adjustable, so that different chain-saw drive units can be employed.

Preferably the driven sprocket is attached to the shaft using a key or spline.

In a second broad aspect this invention provides a for use in cutting a groove or trench in a substrate, wherein the trenching device is comprised of a chain-saw motor drive unit and a trenching attachment adapted for use with the chain-saw motor drive unit; said trenching attachment being capable of repeated attachment to and removal from the chain-saw motor drive unit as a substitute for the original cutting chain and saw blade of the chain-saw.

In a related aspect the trenching attachment includes coupling means capable of being firmly yet reversibly attached to the chain-saw drive unit by means of at least one fastener; said coupling means being attached to a digging chain support means, comprising a first driven sprocket and a nose (idler) sprocket held apart by an elongated cutting beam lying in line with and between the sprockets, wherein the distance between the first driven sprocket and the nose sprocket is adjustable (so that a digging chain in the form of an elongated loop can be tightened and held tightly between the sprockets and around the elongated beam), digging chain support means also comprising at least one sliding surface along at least one side of said elongated beam, drive connection means to couple the first driven sprocket with a second driven sprocket capable of accepting the output of the chain-saw motor by means of an endless primary drive chain capable of being attached to the powered sprocket of the chain-saw drive unit, said means comprising a rotatable shaft supported in perpendicular relationship to the elongated beam, the shaft having the first driven sprocket affixed in line with the elongated beam, the shaft also serving to laterally displace the primary drive chain to one side of the digging chain, so that the cutting beam may be placed substantially in line with the centre of mass of the trenching device regardless of the position of the powered sprocket of the chain-saw drive unit.

Preferably the trenching attachment further includes shaft speed reduction means, so that when in use the digging chain is pulled along the elongated beam at a velocity which is slower than that of the primary drive chain while the motor of the chain-saw drive unit is able to rotate at a preferred rate.

In a related aspect the second driven sprocket capable of accepting the output of the chain-saw motor has a larger circumference than that of the powered sprocket of the chain-saw drive unit.

Preferably a shaft speed reduction means is included within the accessory, so that when in use the digging chain is pulled along the elongated beam at a velocity which is slower than that of the primary endless chain, yet with more force, and a preferred reduction of velocity is to about 40% of initial velocity, although this factor depends on digging chain configuration and soil characteristics.

In a further related aspect the second driven sprocket has about three tines as many teeth as does the powered sprocket of the chain-saw drive unit.

In a third broad aspect the trenching attachment is further provided with ground rest means, said ground rest means comprising one or more bars attached at one end to the trenching attachment, each bar including intermediate ground contact areas, and each bar terminating in a handle.

Preferably each intermediate ground contact area comprises a wheel.

In a fourth broad aspect the attachment further includes a first guard capable of enclosing the primary chain, when in use, and a second guard capable of partially enclosing the first driven sprocket, so that when using the device a person is reasonably protected from injury and from flying debris.

In a fifth broad aspect the invention provides an attachment further including means for sensing electric current flow, so that a person is warned of electrical hazards derived from underground cables when using the device.

In a sixth broad aspect the invention provides a digging chain, the digging chain being in the form of an endless loop of roller chain, provided with projecting teeth on one side; the teeth including a left-hand, a right-hand and a central cutting type of tooth.

PREFERRED EMBODIMENT

The descriptions of the invention to be provided herein are given purely by way of example and are not to be taken in any way as limiting the scope or extent of the invention.

DRAWINGS

FIG. 1: is a side view of the chain-saw attachment.

Figure 2:
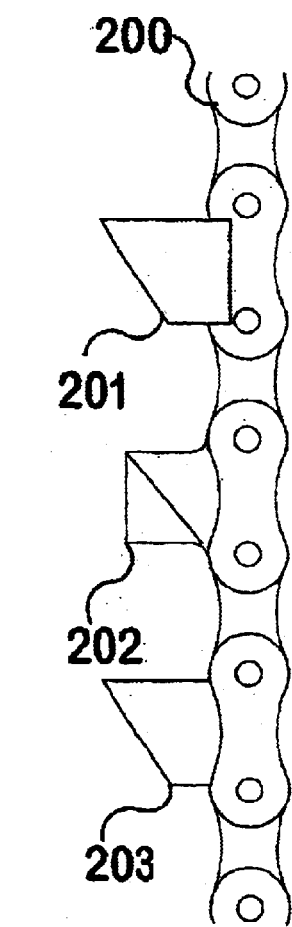

FIG. 2: shows detail of a digging chain.

FIGS. 3, 4, and 5: show sections through example tooth configurations of a digging chain.

FIG. 6: shows another side of the chain-saw attachment.

FIG. 7: shows a cross-section of the chain-saw attachment.

Figure 8:
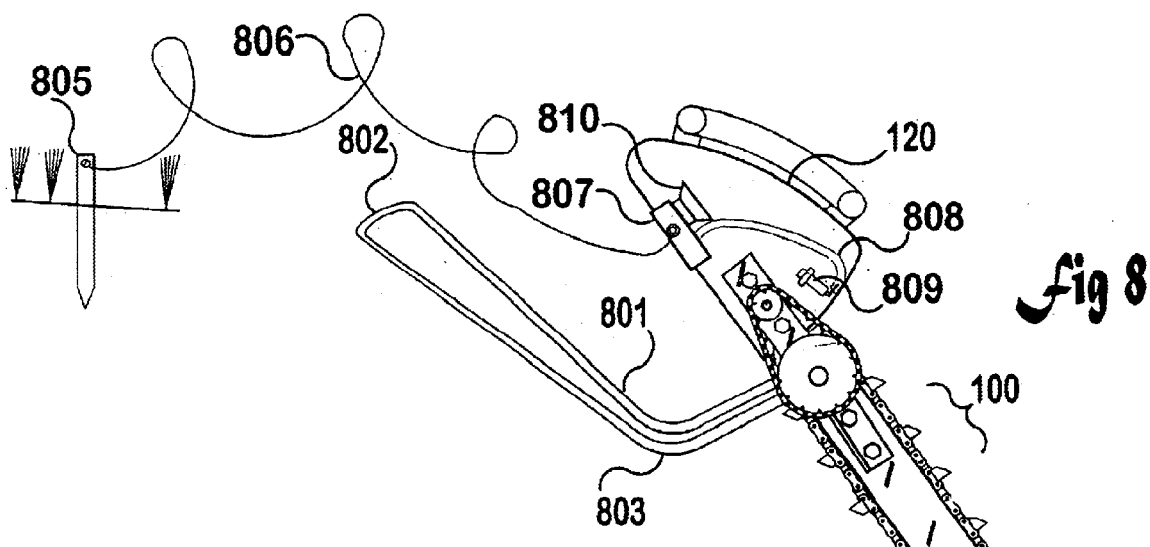

FIG. 8: shows a skid for supporting and pulling the attachment when in use.

Figure 9:
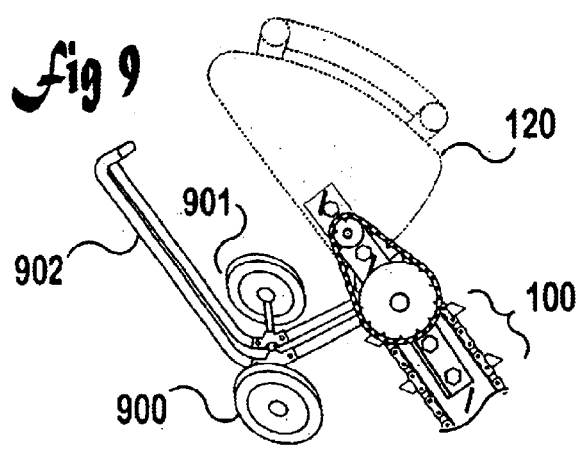

FIG. 9: shows a dolly for supporting and pulling the attachment when in use.

Figure 10:
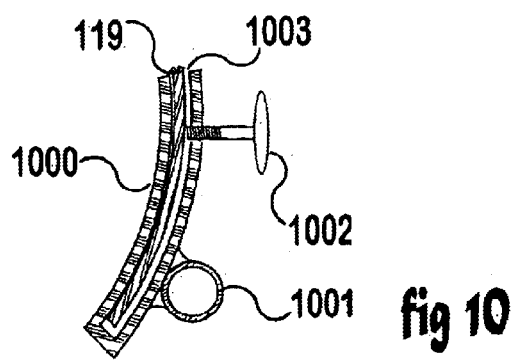

FIG. 10: shows a way to attach wheels to the attachment.

As foreshadowed in the Background, a convenient and portable digging and trenching tool capable of cutting grooves in soil about 30–35 mm wide, up to 1 meter deep and of unrestricted length is provided by the present invention. Advantages of the present invention, which was developed as an attachment for use with the motor section of an ordinary chain-saw, will become apparent in the following description, with reference to the Figures.

The invention may be sold as a separate attachment for an existing chain-saw, preferably where the configuration of the existing chain-saw (in relation to positions of bolts 110, 111 for example) complies with established standards, so that assembly or disassembly can be carried out from time to time by an end-user. Alternatively the invention can be sold as a complete assembly together with a dedicated motor drive unit which for the sake of convenience (and completed field evaluation) may be taken from a chain-saw manufacturer's stocks. Both the inventor's prototype and the first batch of production models have had essentially the same constructional features as will be described herein.

In principle, the invention provides a novel attachment 100 capable of beng attached to an unmodified chain-saw drive unit 120 (which provides both the motive force and a handle). The cutting chain and blade of the ordinary chain-saw is unbolted and removed. The purpose-built attachment includes a chain-driven reduction drive (chain 601 and 22-tooth driven sprocket 102, in combination with the existing 7-tooth drive sprocket 101 of the chain-saw) to better match the working chain-saw pulley speed to a suitable digging chain 200 cutting speed; the reduction drive being coupled along a shaft 103 to a driven sprocket wheel 104 mounted in alignment with one end of a sturdy, hardened steel blade or bar 106 over which the digging chain 200—an endless loop of heavy roller chain bearing soil-cutting teeth 201, 203, 501 is pulled. There is a nose (idling) sprocket and in this Example the sprocket—sprocket distance is 820 mm. As is the case in an ordinary chain-saw the chain is pulled upward (toward the motor unit) underneath the steel bar. The invention provides an optimised solution to a need for burying narrow cables, water pipes and the like well into the ground.

The weight of the device is used to advantage. The weight tends to make the device fall into the ground, so that continual engagement of the tool with the working material is assured. The inventors consider it useful to make the weight of the device (chain-saw together with the attachment) hang "beneath" the point along the chain-saw grip bar which is most conveniently held, in line with the middle of the chain-saw unit itself, so that the person holding the grip bar does not have to exert a sideways force. The invention includes (as shown in FIG. 7) an offsetting of the line of the digging chain (along bar 106) from the line of the original chain-saw saw blade at one side of the drive unit, in line with the drive sprocket 101. This offset is provided for by the shaft 103 and it is clear that any convenient offset can be constructed either at the time of manufacture or by way of a field modification. In the prototypes we use a 55 mm offset. The offset also serves to keep any dirt flung out by the digging chain 200 far from the drive pulley 101 even though the drive pulley is preferably fully enclosed by a shield provided as part of the attachment. Guard 119 (FIGS. 6 and 7) helps to contain the flung dirt. In detail, the entire attachment comprises the following parts:

Attachment means comprising, at least for currently available chain-saw drive units, the bar 112 including (for chain tightening purposes) an elongated aperture capable of accepting existing studs 110, 111 protruding from the chain-saw drive unit. (FIGS. 1, 6) The drive shaft from the crankshaft and clutch holds the existing chain-saw sprocket 101. Nuts on the studs 110 and 111 are used to fasten the attachment to the chain-saw drive unit in the same manner as a chain-saw blade is normally attached. The bar 112 is bolted (in this Example by the bolts that hold the guard 119) to the remainder of the attachment and specifically to the block 117. Hence, variations of the bar 112 can be designed and sold with the digging/trenching attachment to suit a variety of chain-saw drive units.

Drive means includes a first drive chain 601—like an ordinary chain-saw cutter chain but preferably with the cutting teeth removed—is wrapped around existing chain-saw sprocket 101 and new sprocket 102—preferably of a larger circumference in order to provide a reduction of speed. The new sprocket includes a circumferential array of sockets capable of engaging with the teeth 603 projecting inwardly from chain 601, thereby providing a positive drive. This first chain is preferably enclosed within a shield 118. Sprocket 102 is firmly attached to shaft 103 which shaft is free to rotate within a pair of ball bearings 108 and 108a (see FIG. 7). A significant sideways loading may be expected on these bearings during use. In the prototypes, sprocket 102 has been made by laser-cutting or otherwise shaping the perimeter of a steel disk then sandwiching it between two plain steel disks, welding the assembly together, and fitting the assembly onto the shaft using a left-hand thread. At or near the other end of the shaft, a digger chain driving sprocket 104 is attached by means of a coaxial cap screw 109 and thrust washer, and in this Example, a key within a keyway milled into the shaft, in order to prevent inadvertent spinning. Both driven and nose sprockets are relieved sprockets, 9 mm thick and 73 mm outer diameter.

Digger chain support and moving means is provided by an elongated beam 106, preferably made of a hardened steel (such as "Bizaloy", about 50 mm×10 mm), over which the roller chain 200 slides as shown in section in FIG. 3. The sliding area is of course at risk of abrasion from the working material (the soil). At the remote end of the beam 106 there is mounted a nose sprocket wheel 105, held in line with and off the end of the beam by two bars 114 fastened in place by cap-screws 113, 113a according to standard engineering practice. It is useful for the nose sprocket mounting to lie within the space "swept" by the cutting teeth of the digging chain. A ball or roller bearing sealed against ingress of dirt may be provided about the pivot 115 of the nose sprocket wheel, though such a bearing is not shown in these illustrations. Alternatively these parts can be regarded as needing frequent replacement, or made easily greasable. The driven sprocket 104 is held firmly in line with and at an adjustable distance (for chain adjustment purposes) from the beam 106 by means of bolts 107, 107a preferably welded over the housing of the bearings 108, 108a and hence to a mortice, keyway, or similar construction used to minimise twisting strains about the bolts 107, 107a by restricting possible freedom of the beam. Note that the beam is of indefinite length as indicated by the curly lines 602.

Digger chain design was required because no small existing trencher chains were available for the 30–35 mm trench width created by this invention. We use a standard ⅝" transmission chain. FIG. 2 shows at 200 a roller chain having a number of teeth 201, 202, 203 of hardened steel (currently "Bizaloy", 3 mm thick×20 mm long), welded at selected places along its length to outer connectors. As shown in FIGS. 3, 4, and 5, a variety of tooth shapes provides cutting edges at left, right, and centre to tear or cut against the newly formed end of the trench. As will be apparent to a skilled reader, there is freedom to experiment with tooth design, tooth frequency, attachment means, and possibly "scooping teeth" in relation to (a) soil types that may be encountered, and (b) characteristics (such as chain speed and power) of various motor units. Excessive tooth length is undesirable.

Guards and enclosures: Guard 119 comprises a semicircular shield particularly intended to catch dirt flung from the chain-saw as it whips around the driven sprocket, or dirt generally pulled from the trench. A modification of this guard could be used to collect and hence sample the soil for purposes of farm fertiliser application monitoring. Enclosure 118 (shown as a dotted line in FIG. 7) serves to keep the first driving chain away from human hands, and protects that chain from dirt.

Unit support: For short runs, no support is required. If a worker is to use the device for an extended period without developing fatigue, skids or wheels may be attached in order to support the weight of the unit plus its tendency to pull downwards, to act as a pivot point, to hold the unit in case the user loses his footing or is otherwise interrupted, and to help guide the unit along a marked path. FIG. 8 shows a skid, made of pipes 801, 803 attached to the attachment at about the housing around its shaft. The loop 802 may be placed around and behind the worker's back so that he can force the attachment along more easily, although we may prefer to use a rope optionally with a rubber pad behind the user's back. One has to bear in mind the possibility that the unit becomes electrically alive at an unpredictable moment. The outer curve at 803 acts as a fulcrum if the device is swung into the soil. In FIG. 9, a similar support of pipes 902 is shown, having wheels 900, 901. In FIG. 10, a convenient way to attach wheels is shown in section; a curved steel shroud 1000 is shaped to accept the lower part of the semicircular guard 119 into aperture 1003 and be locked in place with hand screw 1002. A tubular axle holder 1001 is welded across part of the shroud and a set of wheels joined by an axle is passed through the tube 1001. A rubber insulation layer may be used within this wheel mounting to help minimise the size of the conducting body in case of cutting into a power cable.

Variations

Bar length: We prefer about 800 mm as a maximum bar length for use with a chain-saw drive unit of medium power/capacity. A larger drive unit could be used with a bar of 1 meter or even 1.5 m length, where trenches of that depth are considered useful. Note that the ends of the bar 106 have been scalloped (116, FIG. 6) in order to extend the sliding surface that backs and supports the chain 200.

A purpose-built trench-digging tool may be constructed, comprising permanent assembly of the above attachment together with a source of motive power—such as an internal-combustion engine, a pneumatic motor, a hydraulic motor (perhaps driven off a farm tractor), or an electric motor. Preferably the motor is built into a housing having convenient handles and weight relief means.

Other speed reduction means: The driven sprocket 104 could be replaced by one having a reduced tooth count. There is room for a planetary gear system to be included along the axis of the shaft 103, although this may be more expensive than simple use of a larger sprocket as 102, as shown here. There may be cases where the extra reduction is required. A belt drive could be used to collect power from the drive unit and a variable-speed belt transmission might be placed here. A low-speed drive unit may be made especially for this application. The amount of reduction disclosed in this example is sufficient to allow the preferred chain-saw drive unit, with a chain as described herein, to run for an extended period with the internal combustion (petrol) engine at an economical, and well-cooled rate.

Trials: Continual development of the invention has produced numerous refinements in the current Example as described herein. We have experimented with variations in cutter bar length, digger chain design, and power units. The current unit is regarded as being ergonomically balanced, has minimal vibration, and rapidly cuts a trench. In one trial, using wheels, a 35 meter long, 30 mm wide and 450 mm deep trench was cut into a difficult wet clay soil in 20 minutes. Trial conditions on various substrates have included hard dry clay soils, moist soils, saturated wet clay soils, alluvial sandy soil, and across limestone gravel cattle races. A local electric power authority ran a trial and cut through tree roots without difficulty. The wheel support has been found very useful for longer trench runs.

Safety: is a known problem with any self-powered device having an exposed cutting area, especially for an ordinary chain-saw. In particular it is likely that an increasing number of already-buried power cables will be encountered by a user of this trench-digging device over time, unless stringent rules for marking and observing the positions of previously laid cables are made and followed. A user should hold the device only by the insulated grips, should wear rubber or other fully insulating boots, and should be aware that at any time the chain-saw and accessory may become electrically live as a result of having sawn into an unsuspected live electric cable.

A leakage current sensor may be a useful addition. See FIG. 8. One form of sensor involves use of a remote ear peg 805, connected by wire 806 to the chassis 120 of the invention 100 (which is a conducting unit), through a current-sensing module 807. In the event of any significant flow of current through the wire, the chain-saw ignition circuit is immediately disabled and a visual and audible alarm 810 sounds. Users will have been particularly instructed to treat the invention as electrically live when this alarm condition occurs. The sensitivity of this device may be sufficient to detect relatively small electric currents flowing adjacent to an earthed conduit, as a result of earth loops or in particular the neutral currents relied on in three-phase circuits or the like, or the sensitivity may be so low that only contact with live conductors sets it off. Pulses arriving from electric fences as used on New Zealand farms may require active rejection.

Commercial Benefits or Advantages

The invention is more convenient, more manoeuvrable, easily transported without a special vehicle, and much cheaper than conventional motorised digging equipment Many trenches need be only about 30–35 mm wide to accommodate a 25 mm cable or water-pipe and it is wasteful to dig a wider trench.

In situations where a wider, accurately cut trench is required the invention may be used to create a pair of parallel cuts a desired distance apart. A spade or the like is used to remove the soil between the cuts.

This tool is useful for telephone installers and linesmen, electricians, builders, plumbers, landscapers, as well as farmers.

Because many outdoors workers already possess a chain-saw, it is useful to provide an accessory that replaces the usual saw blade and cutter chain.

The lower speed of the digger chain is an advantage over prior-art devices which used the unaltered chain-saw speed in a soil trencher.

The offset axis of the digger chain places the cutter bar at about the centre of gravity of the unit, and separates thrown-out soil from the region of the chain-saw drive chain.

It is advantageous to separate the high-wear digging chain from the drive mechanism.

Although a number of preferred examples as described above have been disclosed for illustrative purposes, those skilled in the art will appreciate that various modifications, additions, and substitutions to the apparatus and methods described herein are possible without departing from the scope and spirit of the invention as set forth in the following claims.

We claim:

1. A hand-held motorized trenching device for cutting a slit or trench into a substrate, comprising:
    a chain-saw motor unit;
    an elongated and outwardly extending cutting blade, the cutting blade attached to the chain-saw motor unit;
    the cutting blade supporting a digging chain in the form of an endless loop surrounding the cutting blade, the digging chain carrying a plurality of attached digging teeth;
    the digging chain being capable of being pulled along an edge of the cutting blade by a secondary drive wheel located at a proximal end of the cutting blade;
    the secondary drive wheel mounted on a second end of a rotatably supported shaft; and
    a primary drive wheel mounted on a first end of the shaft in line with a drive sprocket of the chain-saw motor unit so that an endless drive chain can be placed over the primary drive wheel and the drive sprocket, whereby in use, operation of the motor causes the digging chain to be pulled,
    a distance between the primary drive wheel and the secondary drive wheel being such that the second drive wheel and the cutting blade are held in line with the middle of the chain-saw unit,
    wherein a person holding a grip bar of the device does not have to exert a sideways force in order to counteract a lack of balance of a weight of the trenching device, and the weight of the trenching device falls in line with an area on the grip bar of the chain-saw motor unit that is gripped by a user when in use.

2. A motorized trenching device as claimed in claim 1, wherein the trenching device further includes a protective guard located between the digging chain and the chain-saw motor unit, so that in use the guard traps debris flung off the chain.

3. A motorized trenching device as claimed in claim 1, wherein relative diameters of the primary drive wheel and the secondary drive wheel are selected, in relation to the drive sprocket of the chain-saw motor unit, so as to provide a reduction in speed of the digging chain, as compared to a speed of a conventional chain-saw chain directly attached to the drive sprocket of the chain-saw motor unit, and so that the motor and the digging chain can operate together yet at respective optimum speeds.

4. A motorized trenching device as claimed in claim 3, wherein the relative diameters of the primary drive wheel and the secondary drive wheel provide an about 3:1 reduction in speed of the digging chain as compared to the speed of the conventional chain-saw chain directly attached to the drive sprocket of the chain-saw motor unit.

5. A motorized trenching device as claimed in claim 4, wherein the trenching device is further provided with ground rest means comprising one or more bars attached at one end to the trenching device, each bar including intermediate ground contact areas.

6. A trenching device as claimed in claim 5, wherein each bar terminates in a handle.

7. A trenching device as claimed in claim 5, wherein each intermediate ground contact area comprises a wheel.

8. A trenching device as claimed in claim 1, wherein the trenching device further includes a detector for sensing electric current flow so that a person is warned of electrical hazards derived from underground cables when using the device.

9. An attachment for use in combination with a standard chain-saw motor unit, comprising, when combined, a hand-held motorized trenching device to be used by a person for cutting a slit or trench into a substrate, the attachment comprising:

an elongated and outwardly extending cutting blade, the cutting blade adapted to be reversibly attached to the chain-saw motor unit;

the cutting blade supporting a digging chain in the form of an endless loop surrounding the cutting blade, the digging chain carrying a plurality of attached digging teeth;

the digging chain being capable of being pulled along an edge of the cutting blade by a secondary drive wheel located at a proximal end of the cutting blade;

the secondary drive wheel mounted on a second end of a rotatably supported shaft; and a primary drive wheel mounted on a first end of the shaft in line with a drive sprocket of the chain-saw motor unit so that an endless drive chain can be placed over the primary drive wheel and the drive sprocket, whereby in use, operation of the motor causes the digging chain to be pulled, a distance between the primary drive wheel and the secondary drive wheel being such that the second drive wheel and the cutting blade are held substantially in line with the middle of the chain-saw unit, wherein a person holding a grip bar does not have to exert a sideways force in order to counteract a lack of balance of a weight of the trenching device, and the weight of the trenching device falls in line with an area on the grip bar of the chain-saw motor unit that is gripped by a user when in use.

10. A motorized trenching device as claimed in claim 9, wherein the trenching device further includes a protective guard located between the digging chain and the chain-saw motor unit, so that in use the guard traps debris flung off the chain.

11. A motorized trenching device as claimed in claim 9, wherein relative diameters of the primary drive wheel and the secondary drive wheel are selected, in relation to the drive sprocket of the chain-saw motor unit, so as to provide a reduction in speed of the digging chain, as compared to a speed of a conventional chain-saw chain directly attached to the drive sprocket of the chain-saw motor unit, and so that the motor and the digging chain can operate together yet at respective optimum speeds.

12. A motorized trenching device as claimed in claim 11, wherein the relative diameters of the primary drive wheel and the secondary drive wheel provide an about 3:1 reduction in speed of the digging chain as compared to the speed of the conventional chain-saw chain directly attached to the drive sprocket of the chain-saw motor unit.

13. A motorized trenching device as claimed in claim 12, wherein the trenching device is further provided with ground rest means comprising one or more bars attached at one end to the trenching device, each bar including intermediate ground contact areas.

14. A trenching device as claimed in claim 13, wherein each bar terminates in a handle.

15. A trenching device as claimed in claim 14, wherein each intermediate ground contact area comprises a wheel.

16. A trenching device as claimed in claim 9, wherein the trenching device further includes a detector for sensing electric current flow so that a person is warned of electrical hazards derived from underground cables when using the device.

* * * * *